United States Patent [19]

Flora et al.

[11] Patent Number: 4,958,351
[45] Date of Patent: Sep. 18, 1990

[54] HIGH CAPACITY MULTIPLE-DISK STORAGE METHOD AND APPARATUS HAVING UNUSUALLY HIGH FAULT TOLERANCE LEVEL AND HIGH BANDPASS

[75] Inventors: Laurence P. Flora, Covina; Gary V. Ruby, Pasadena, both of Calif.

[73] Assignee: Unisys Corp. (Formerly Burroughs Corp.), Detroit, Mich.

[21] Appl. No.: 176,480

[22] Filed: Apr. 1, 1988

Related U.S. Application Data

[63] Continuation-in-part of Ser. No. 825,495, Feb. 3, 1986, abandoned, which is a continuation-in-part of Ser. No. 825,174, Feb. 3, 1986, Pat. No. 4,722,085.

[51] Int. Cl.⁵ .............................................. G06F 11/10
[52] U.S. Cl. ................................. 371/40.1; 371/21.1
[58] Field of Search ................ 371/21, 37, 38, 39, 371/40, 10, 22, 21.1, 21.2, 21.5, 21.6, 37.1, 40.1, 40.2, 40.3, 40.4, 10.1, 10.2; 364/200, 900; 360/20, 98.01, 25, 26

[56] References Cited

U.S. PATENT DOCUMENTS

| | | | |
|---|---|---|---|
| 4,719,367 | 11/1987 | Grafe | 371/38 |
| 4,722,085 | 1/1988 | Flora | 371/38 |
| 4,768,197 | 8/1988 | Petolino | 371/38 |
| 4,791,642 | 12/1988 | Taylor | 371/38 |
| 4,817,035 | 3/1989 | Timsit | 360/22 |

Primary Examiner—Michael R. Fleming
Attorney, Agent, or Firm—Nathan Cass; R. S. Bramson; Mark T. Starr

[57] ABSTRACT

A multiplicity of independently operating disk drive subsystems are coupled to a read/write interface containing error circuitry and data organizer circuitry. The data organizer circuitry organizes read/write data for read/write communication with the disk drive subsystems via the error circuitry such that the overall system appears as a large, high capacity disk drive system having an unusually high fault tolerance and a very high bandpass. Caching is additionally provided in the read/write interface in a manner which takes advantage of the organization provided by the data organizer to significantly improve overall performance. Advantage is also taken of the conventionally provided error detection capability of each disk drive subsystem to enhance the capability of the error circuitry.

28 Claims, 6 Drawing Sheets

HIGH CAPACITY MULTIPLE-DISK STORAGE METHOD AND APPARATUS HAVING UNUSUALLY HIGH FAULT TOLERANCE LEVEL AND HIGH BANDPASS

REFERENCE TO RELATED PATENT APPLICATIONS

This application is a continuation-in-part of U.S. patent application Ser. No. 825,495, filed Feb. 3, 1986, now abandoned. This application is also related to the commonly assigned U.S. patent application Ser. No. 825,174, filed Feb. 3, 1986, now U.S. Pat. No. 4,722,085.

BACKGROUND OF THE INVENTION

The present invention generally relates to improved means and methods for providing highly reliable, high capacity peripheral storage for use in a data processing system, and more particularly to a high capacity disk storage system comprised of multiple, independently operating disk drives cooperating with error correction circuitry in a manner so as to function as a high capacity disk drive having an unusually high fault tolerance level and a very high bandpass. The invention also contemplates the incorporation of a cache in a manner which significantly improves overall performance. In present day computer systems, the reliability of the peripheral storage system employed therewith is a critical item affecting overall system reliability, particularly where disk drives (today's favored peripheral storage devices) are used for peripheral storage. The primary reason is that the reliability of modern CPUs (computer processing units) has easily outstripped the reliability of the disk systems with which they are employed despite the intensive activity in recent years to improve the reliability of these disk systems.

The imbalance between the reliability of CPUs and disk systems has led to the development of data-base systems with audit trails which make it possible to reconstruct a data base after the failure and repair of the disk system.

Also, a so-called "mirrored disk" approach is typically used in which all data is written to two disk drive simultaneously, allowing easy recovery if one of them fails.

Known approaches (such as those mentioned above) for protecting the integrity of data in the event of disk failure are expensive either in direct equipment cost and/or in system performance. What is vitally needed, therefore, is a new approach for significantly increasing the reliability (fault tolerance) of a high capacity disk storage system which will not require the considerable expense and complexity of presently known approaches.

SUMMARY AND OBJECTS OF THE INVENTION

Accordingly, a broad object of the present invention is to provide improved means and methods for achieving a highly reliable, high capacity peripheral storage system which does not require the considerable expense and complexity of presently known approaches. A more specific object of the invention is to provide an economical, highly reliable, high capacity disk storage system which is able to take advantage of the economies and other advantages characteristic of relatively small disk drives.

A further object of the invention is to provide a multiple-disk high capacity disk storage system having an unusually high level of fault tolerance.

An additional object of the invention in accordance with the foregoing object is to provide a high capacity disk storage system having a very high bandpass.

A still further object of the invention in accordance with one or more of the foregoing objects is to provide a high capacity disk storage system having a very low access time.

The above objects are accomplished in a particular preferred embodiment of the invention by employing multiple disk drives amongst which data is distributed and with respect to which error detection and correction is provided in a manner such that an unusually high level of fault tolerance is economically achieved as well as a very high bandpass. In addition, caching is provided in a particularly advantageous manner which achieves significant performance improvements.

The specific nature of the invention as well as other objects, features, advantages and uses thereof will become evident from the following description of a preferred embodiment taken in conjunction with the accompanying drawings.

DESCRIPTION OF PREFERRED EMBODIMENTS

Like numbers and characters designate like elements throughout the figures of the drawings.

Initially, it is to be noted that the present invention resides in a novel and unobvious combination of elements which can be implemented using well known apparatus and components. Accordingly, the description of particular preferred embodiments of the invention will be presented using electrical block and schematic diagrams along with accompanying operative descriptions which together will be sufficient to permit those skilled in the art to readily practice the invention.

Figure 1:
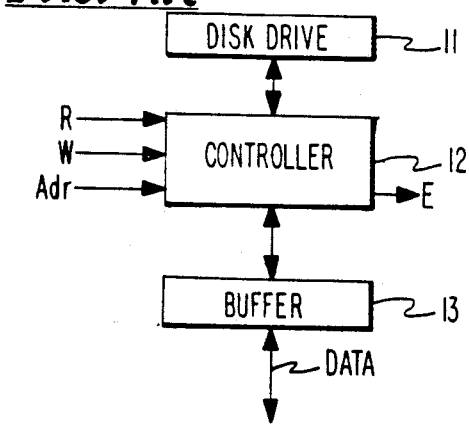
FIG. 1 is a block diagram illustrating a conventional small, disk subsystem.

Referring first to FIG. 1, illustrated therein is a conventional, commercially available small disk subsystem 10 comprising a disk drive 11 and an associated disk controller 12 and disk buffer 13. Each controller 12 typically provides its own burst error checking and correcting, the occurrence of an uncorrectible error during a reading or writing operation typically being indicated by an error output signal E. The reliability and performance of such a disk subsystem has been improved significantly in recent years, while the cost has been falling steadily. A typical disk drive subsystem 10 may, for example, comprise a 5¼ inch disk drive providing a storage capacity of 86 megabytes and an access time of 35 milliseconds. A larger capacity disk drive having 500 to 800 megabytes storage capability is also now available.

A conventional disk subsystem 10, such as illustrated in FIG. 1, basically operates such that (1) in response to write and address signals W and Adr applied to the disk controller 12, the controller 12 causes data in the disk buffer 13 to be written to the corresponding addressed disk location, and (2) in response to read and address signals R and Adr, the controller 12 causes data from the corresponding addressed disk location to be read into the disk buffer 13. The typical data size which is addressed on each disk corresponds to a sector of data and comprises, for example 256 bytes or 2048 bits (a byte being 8 bits). Typically, the buffer 13 provides for storage of one or more sectors of data. The address signals Adr identify the disk track and sector with respect to which reading or writing is to take place.

Figure 2:
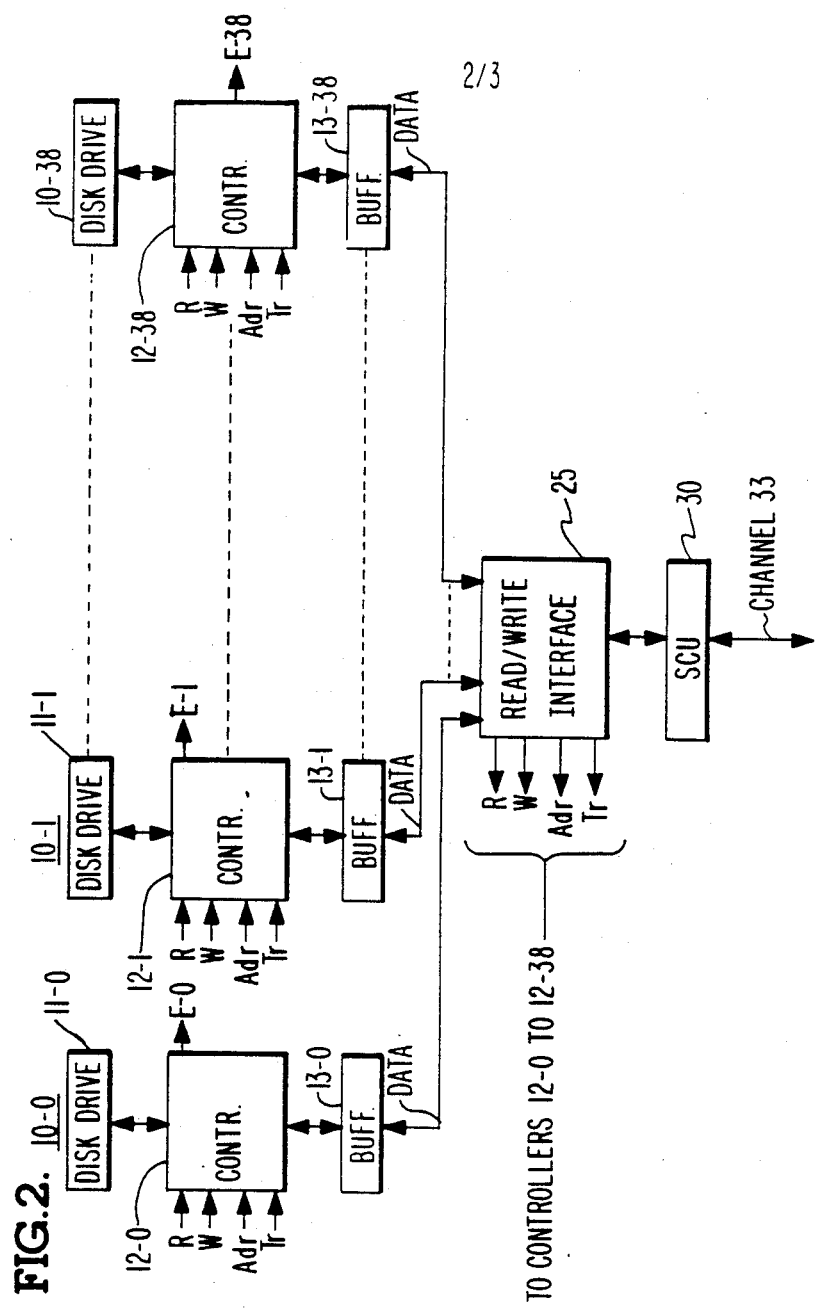
FIG. 2 is a block diagram illustrating a first embodiment of the invention.

Reference is next directed to FIG. 2 which illustrates a particular preferred embodiment of the invention in which a relatively large number of the relatively small disk subsystems 10 shown in FIG. 1 are electrically coupled together so as to function as a high capacity disk system having an unusually high level of fault tolerance.

In the particular preferred embodiment of the invention illustrated in FIG. 2, a high capacity disk system is illustrated which employs thirty-nine disk drive subsystems 10-0 to 10-38 of the type shown in FIG. 1. In this preferred embodiment shown in FIG. 2, data is read from or written in parallel to a commonly addressed sector of each disk 11-0 to 11-38; the common address being determined by signals Adr applied in parallel to the controllers 12-0 to 12-38 along with a read R or write W signal as shown. Signal Tr serves as an initiation signal. For a read operation, a sector of data from the addressed sector of each disk is read into its respective buffer 13-0 to 13-38; and for a write operation, a sector of data from each respective buffer 13-0 to 13-38 is written into the addressed sector of its respective disk. The occurrence of an uncorrectible error during a read or write operation of a disk drive subsystem 10-0 to 10-38 is indicated by the respective one of the error output signals E-0 to E-38 becoming true.

Figure 3:
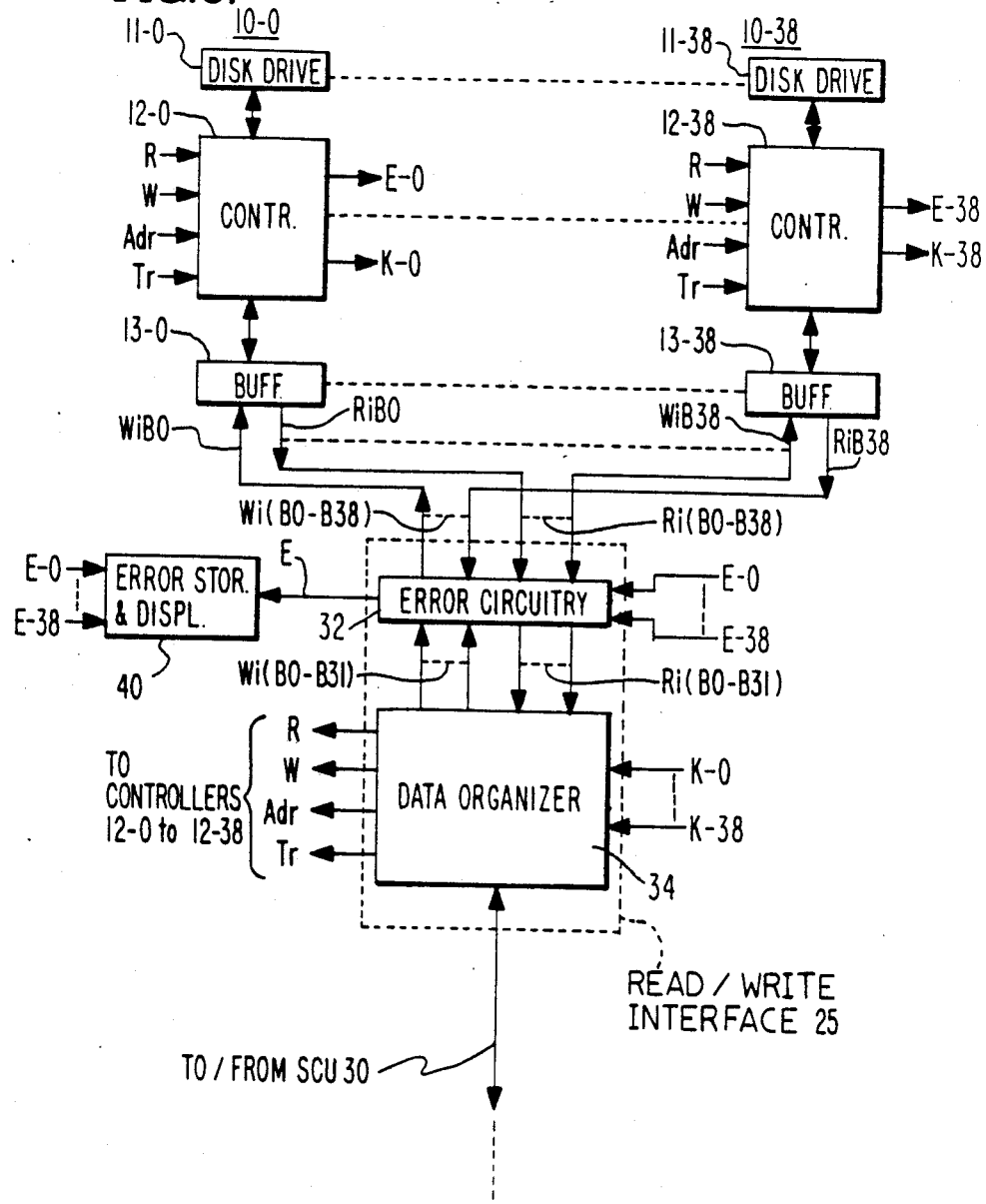
FIG. 3 is a block diagram illustrating in greater detail how the read/write interface 25 of the preferred embodiment illustrated in FIG. 2 is interconnected with the disk subsystems 10-0 to 10-38.

As also shown in FIG. 2, a read/write interface 25 is provided for interfacing the disk subsystems 10-0 to 10-38 to a storage control unit (SCU) 30 which in turn is typically coupled to a computer channel indicated at 33. FIG. 3 illustrates a particular preferred embodiment of this read/write interface 25 and its interconnection to the disk subsystems 10-0 to 10-38. As shown in FIG. 3, the read/write interface 25 includes error circuitry 32 and a data organizer 34. As will shortly be described in more detail, the error circuitry 32 serves to provide a high fault tolerance for the high capacity peripheral storage system formed using the disk subsystems 10-0 to 10-38, while the data organizer 34 serves to appropriately organize read and write data for transmission to the circuitry which is to receive the data.

More specifically, the data organizer 34 in FIG. 3 organizes write data received from the SCU 30 so that the data is appropriately organized for distribution (via error circuitry 32) to the buffers 13-0 to 13-38 (FIG. 2) of the disk subsystems 10-0 to 10-38; and organizes read data received from the buffers 13-0 to 13-38 of the disk subsystems 10-0 to 10-38 (via error circuitry 32) so that the data is appropriately organized for distribution to the SCU 30. The data organizer 34 also responds to data received from the SCU 30 to provide appropriate sector address and transfer signals Adr and Tr and read and write signals R and W for application in parallel to the disk controller 12-0 to 12-38 (FIG. 2).

The specific manner in which the error circuitry 32 provides a high fault tolerance for the high capacity peripheral storage system formed from the disk subsystems 10-0 to 10-38 will now be explained by considering typical read and write operations for the illustrated preferred embodiment.

Figure 4:
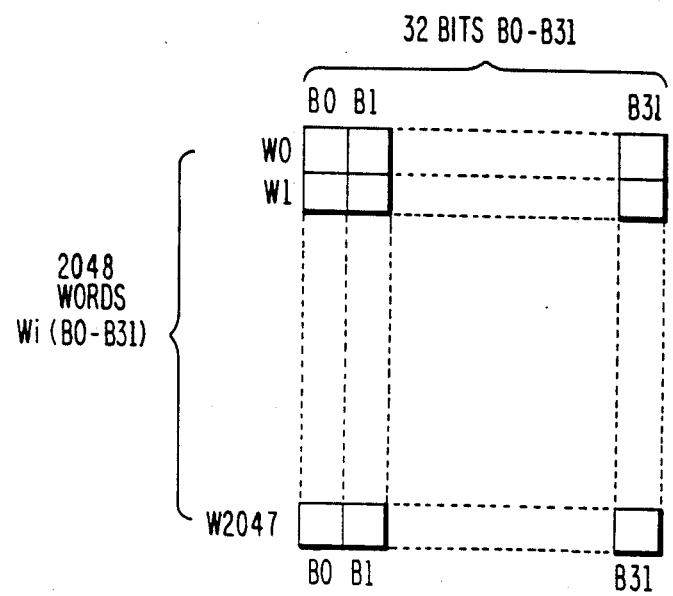
FIG. 4 is a schematic diagram illustrating how data is organized by the data organizer 34 in FIG. 3.

Write operations will be considered first. In the particular preferred embodiment being described, the basic segment of write data transmitted to the data organizer 34 in FIG. 3 by the SCU 30 is chosen to correspond to 32 disk sectors, a sector typically being comprised of 256 bytes or 2048 bits as noted previously. The data organizer 34 organizes this basic segment of data into 2048 words W0-W2047, each word being comprised of 32 bits B0-B31; as schematically illustrated in FIG. 4. The data organizer 34 feeds these 2048 32-bit words W0-W2047 one word at a time (i.e., serially) to error circuitry 32 which adds seven additional error check bits B32-B38 to each 32-bit word in a conventional manner to thereby produce a resultant 39-bit word at its output having error checking and correction capability. These 2048 serially applied, 32-bit words fed to error circuitry 32 are indicated in FIG. 3 by Wi (B0–B31), and the 2048 serially produced 39-bit words produced at the output of the error circuitry 32 are indicated by Wi (B0–B38) where "i" has values from 0 to 2047 respectively corresponding to the 2048 words W0 to W2047. It will be understood that the generation of error check bits and their use for error detection and correction are well known in the art and can readily be implemented. Further information in this regard can be found, for example, in the article by R. W. Hamming, "Error Detecting and Error Correcting Codes", Bell Systems Technical Journal, 29, 1950, pp. 147–160 and in U.S. Pat. Nos. 4,375,664; 4,168,486; and 4,052,698.

Still with reference to FIG. 3, the 39 bits B0–B38 of each of the 2048 words Wi (B0–B38) serially produced at the output of the error circuitry 32 are respectively applied to the buffers 13-0 to 13-38 of the 39 disk drive subsystems 10-0 to 10-38. For example, as shown in FIG. 3, buffer 13-0 receives the 2048 B0 bits WiB0 of the 2048 serially-produced words Wi (B0–B38) and buffer 13-38 receives the 2048 B38 bits WiB38 of Wi (B0–B38). As previously described in connection with FIGS. 1 and 2, these 2048 bits stored in each of the buffers 13-0 to 13-38 are written in parallel into the sectors of the respective disks 10-0 to 10-38 in response to a write signal W, the sector address being determined by the common address signals Adr applied in parallel to the disk controllers 12-0 to 12-38.

Having described how write operations are performed in the preferred embodiment shown in FIG. 3, read operations will next be considered. As previously described in connection with FIGS. 1 and 2, the disks 11-0 to 11-38 are read in response to a read signal R and an address Adr applied in parallel to the disk controllers 12-0 to 12-38 which operate to read the data in the addressed sectors into their respective buffers 13-0 to 13-38. Based on the writing operation described above, it will be understood that, after such reading, each of the buffers 13-0 to 13-38 will contain the 2048 bits corresponding to a respective one of the thirty-nine bits B0 to B38. For example, after reading, buffer 11-0 will contain the 2048 B0 bits RiB0 of words Wi (B0–B38) and the buffer 13-38 will contain the 2048 B38 bits RiB38 of words R0 to R2048.

In the particular preferred embodiment being described, the transfer to the error circuitry 32 of the 2048 39-bit words Ri (B0-B38) read into buffers 13-0 to 13-38 as described above is initiated by the transfer signal Tr applied in parallel to the disk controllers 12-0 to 12-38. This transfer signal Tr is produced at a sufficiently later time following initiation of a reading operation so that all of the disks 11-0 to 11-38 will have completed the reading out the data from their addressed sector into their respective buffers 13-0 to 13-38 taking into account worst case conditions. In a similar manner, during the previously described writing operations, adequate time is provided for all of the disks to complete the writing of data into their addressed sector taking into account worst case conditions. This is implemented, as indicated in FIG. 3, by using signals K-0 to K-38 typically provided by controllers 12-0 to 12-38, respectively, which indicate when their respective disk read or write operation is completed. These signals K-0 to K-38 are applied to data organizer 34 for determining when transfer signal Tr is produced and for determining when all of the disk drives have completed their read or write operations. It will thus be understood that the disk subsystems 10-0 to 10-38 are able to operate independently of one another, since it will not matter what the relative location of the accessing head is to the addressed sector on the various disks during reading and writing. Furthermore, it is important to note that, even when these worst case conditions are taken into account for the reading and writing operations, the bandpass is still very high since reading and writing is performed in parallel with respect to the disk subsystems 10-0 to 10-38.

Continuing with the description of reading operations in the particular preferred embodiment shown in FIG. 3, in response to initiation of transfer operations by the transfer signal Tr, the respective bits read into the buffers 13-0 to 13-38 from the commonly addressed sector (as described above) are applied to the error circuitry 32 as 2048 serially produced 39-bit words Ri (B0-B38), each word containing a respective bit from one of the buffers 13-0 to 13-38. If no error has occurred, these words Ri (B0-B38) will be identical to the words Wi (B0-B38) sent to these buffers from the error circuitry 32 and written at the commonly addressed sector on the disks as previously described.

The error circuitry 32 operates in a conventional manner in response to these serially applied words Ri (B0-B38) to detect errors in each word, and to correct such errors to the extent of its capability. In the particular preferred embodiment being described, it will be assumed that the error circuitry 32 operates in a conventional manner (using the check bits B32 to B38 in each word) to detect and correct a single bit error in each word and to also provide an error output E to error storage and display circuitry 40 for providing a recoverable and/or displayable record indicative of the type, number and bit location of detected errors. As shown in FIG. 3, the resulting corrected 32-bit words Ri (B0-B31) produced by the error circuitry 32 are applied to the data organizer 34 which appropriately organizes these words for transmission to the SCU 30. Having described the construction and operation of the particular preferred embodiment of the invention illustrated in FIGS. 1-4, the manner in which a high fault tolerance is achieved for this preferred embodiment will now be explained. It will be understood that, because each of the 39-bit words read from the disks 11-0 to 11-38 and applied to the error circuitry 32 in this preferred embodiment is comprised of one bit from each disk drive, a single error in one of the bits will not cause a fault, since this single bit error will automatically be corrected by the error circuitry 32. Thus, one of the disk subsystems 10-0 to 10-38 could be totally inoperative (or even removed from the system) and still no fault would occur. Furthermore, no recovery routine or transfer of data between disks would be required in order to maintain proper operation. Of course, if error correction were provided for correcting two bits in error, then two of the disk subsystems 10-0 to 10-38 could be inoperative (or absent).

Since error circuitry, such as illustrated by 32 in FIG. 3, typically provides information as to the type and bit location(s) of errors, it is advantageous to apply such error data to conventional storage and display circuitry 40 (as shown in FIG. 3) which can be referred to for preventive maintenance purposes. For example, if it is noted that a disk drive is producing more than a certain number of bit errors, the disk drive could be disconnected from the system and replaced with another disk drive without interfering with normal operation, since the system will not be affected by removal of the disk (assuming, of course, that the total number of correctable bit errors is not exceeded).

The present invention additionally permits advantage to be taken of the error output signals E-0 to E-38 provided by the disk drive controllers 12-0 to 12-38, respectively. One way in which this is done is to apply these error output signals E-0 to E-38 to display circuitry 40 (as shown in FIG. 3) for use as a further check of whether a disk has failed, since a non-disk error could occur between a buffer 13 and the error circuitry 32. Another and particularly advantageous use of these error output signals E-0 to E-38 is to apply them to error circuitry 32 (as also shown in FIG. 3) for use in obtaining expanded performance of error circuitry 32. More specifically, it will be understood from the previously referenced R. W. Hamming article that by inputting error signals E-0 to E-38 to the error circuitry 32 which indicate the bit positions in error, the error circuitry 32 can provide for correcting errors in a greater number of bit positions than would be possible where the error circuitry 32 had to itself determine which bit positions were in error. For example, where 7 check bits are added to a 32-bit word, as in the above described embodiment, the error circuitry 32 would be able to provide for correcting only a single bit position if the error inputs E-0 to E-38 were not provided. However, by inputting the error signals E-0 to E-38 to the error circuitry 32 (as shown in FIG. 3), the use of these 7 check bits now permits errors in two bit positions to be corrected.

One of the advantageous characteristics of the preferred multiple-disk drive system described in FIGS. 2-4 is that the disks 11-0 to 11-38 in FIG. 3 are able to operate independently without having to provide for synchronizing their rotational speeds and relative sector positions. As pointed out previously, this is achieved by providing adequate time during reading and writing operations to permit all of the disks to complete their respective read or write operations. However, this has the result of increasing the disk access time.

Next to be considered are the embodiments of FIGS. 5-8 which disclose additional important aspects of the present invention, wherein caching is incorporated in the embodiment of FIG. 3 in a manner such that the overall disk access time is significantly reduced, while also achieving other performance improvements. More specifically, caching is employed in the multiple-disk embodiment of FIG. 3 in a manner which takes advantage of the multiple-disk organization and its error checking and correcting characteristics such that its high fault tolerance and high bandpass features are retained while additionally providing a significant improvement in overall access time, whereby overall system performance is improved to a greater extent than obtained when using caching with conventional disk drives.

Figure 5:
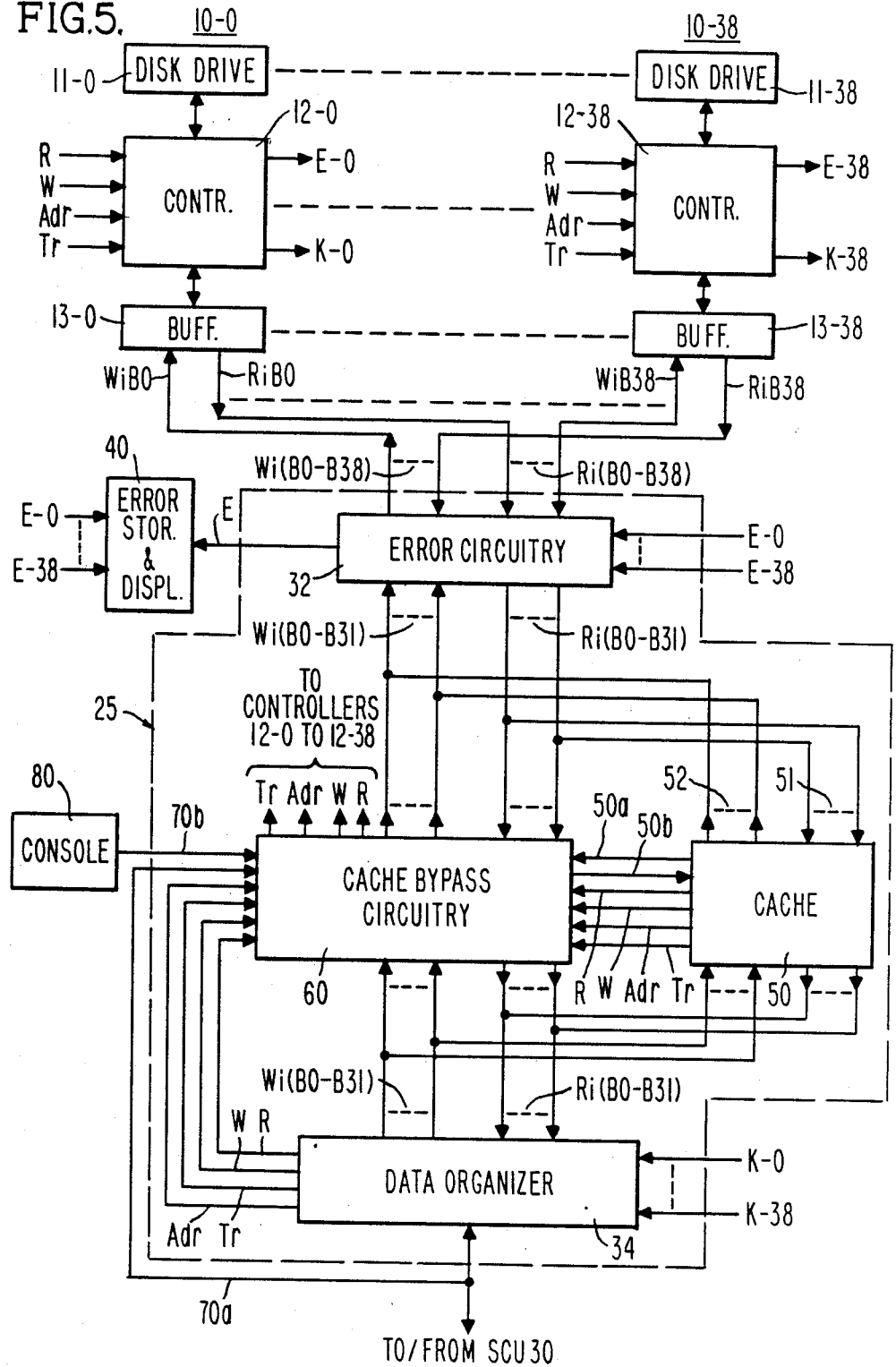
FIGS. 5-8 are a block diagram illustrating an additional embodiments invention which incorporates caching in a particularly advantageous manner.

A first manner in which caching may be provided in a multiple-disk system in accordance with the invention is illustrated in FIG. 5. It will be seen from FIG. 5 that a cache 50 and cache bypass circuitry 60 are added to the system of FIG. 3. Also note that the signals R, W, Adr, and Tr from the data organizer 34 in FIG. 5 are not applied directly to the controllers 12-0 to 12-38 as in FIG. 3, but rather are under the control of the bypass circuitry 60 so that disk accessing can be controlled thereby. In FIG. 5, the cache control 70 is responsive to a control signal 70a provided by SCU 30 which determines whether or not the cache bypass circuitry 60 is to be active during an I/O operation.

If the control signal 70a indicates that cache bypass circuitry 60 is to be active, it provides a signal 50a to the cache 50 which deactivates the cache 50 so that a non-caching operating mode is provided for which the cache plays no part in the I/O operation. The bypass circuitry 60 also produces a disk access signal G which is applied to data organizer 34, error circuitry 22, and controllers in preparation for a disk access operation. The resulting operation is then as previously described with respect to FIG. 3, whereby the cache bypass circuitry 60 provides for passing on the signals R, W, Adr, and Tr to the controllers 12-0 to 12-38, and also provides appropriate paths for routing data between the data organizer 34 and the error circuitry 32. Operation in such a non-caching mode is advantageous for those types of I/O processing operations for which caching would not be of value, such as for example, data streaming operations. In such a case, SCU 30 provides an appropriate non-caching signal 70a, either based on its own operation or in response to a signal provided by a host. As indicated in FIG. 5, provision is also made for an operator to provide this non-caching mode in response to a signal 70b provided from a console 80.

The respective read, write and address signals R, W, and Adr applied to the cache bypass circuitry 60 are also advantageously employed to permit the cache bypass circuitry 60 to additionally be selectively activatable dependent upon whether a read or write operation is to be performed and/or dependent upon whether the address Adr is one for which it is desired that caching be provided. For example, to prevent the possibility of loss of data, caching could be permitted to be performed only for read operations. It may also be desirable to permit caching only for a predetermined range of addresses.

If any of the signals 70a, 70b, R, W, or Adr applied to the cache bypass circuitry 60 indicate that caching is to be provided for an I/O operation, then the cache bypass circuitry 60 is not activated; in such a case, the cache bypass circuitry 60 applies the signals R, W, Adr, and Tr to the cache 50 along with an activation signal 50a to activate the cache 50 for caching operation. Cache 50 is constructed and arranged to store data in the form of data blocks (for example, 250 data blocks). Assuming that data is organized as previously described in connection with FIG. 3, each data block contains 2048 32-bit words W0–W2047 as shown in FIG. 4, wherein each word is comprised of 32 data bits B0–B31 which bits respectively correspond to disk drives 11-0 to 11-31. The specific construction and operation of the cache 50 in the illustrative embodiment of FIG. 5 will become evident from the following descriptions of typical read and write I/O operations occurring for situations where the cache 50 is activated.

A typical read operation occurring while the cache is activated will be considered first. When a read operation is to be performed, the data organizer 34 provides an appropriate read signal R and an associated read address Adr which, in the FIG. 5 embodiment, is applied to the cache 50 via cache bypass circuitry 60 along with activation signal 50a. When the cache 50 is activated, it operates in a well known manner to determine whether the data block corresponding to the associated read address Adr is stored in the cache. If so, a "hit" has occurred and results in cache 50 transmitting the requested data block to the data organizer 34 without any need to access the disk drives. The organization and accessing architecture of the cache 50 is chosen so that the 2048 words R0 (B0–B31) to R2047 (B0-31) constituting the requested data block are serially outputted, one at a time from the cache 50 to the data organizer 34 in the same manner as occurs during non-caching operation.

If, on the other hand, the requested date block is not found in cache 50, then a "miss" has occurred and the cache 50 applies a "miss" signal 50b to the cache by-pass circuitry 60. In response to this "miss" signal 50b, cache bypass circuitry 60 provides for a disk read operation in the same manner as previously described for non-caching operation. However, cache 50 remains activated to also receive, via lines 51, the data block read from the disk drives 11-0 to 11-38, this received data block being stored in the cache 50 at a corresponding address. Such cache operation takes advantage of the well known LRU (least recently used) algorithm which assumes that recently requested data is more likely to be next requested than less recently requested data (other cache algorithms could also be employed). As is conventional, cache 50 operates in the event the cache is full when a newly accessed disk data block is applied thereto, to replace the least recently used data block in the cache with the newly accessed data block. As is also conventional, cache 50 is additionally provided with the capability of returning this displaced least recently used data block to its corresponding location in disk storage. Such return of a data block is provided, for example, where the contents of the data block are different from that currently stored at the corresponding address in disk storage and it is desired that this different data block be written at that disk storage address. An example of the construction and arrangement of a known disk cache system is in detail in U.S. Pat. No. 4,394,733.

Next to be considered is how caching may be employed with a write operation. When a write operation is to be performed, the data organizer 34 provides an appropriate write signal W and an associated write address Adr which, in the FIG. 5 embodiment, is applied to the cache 50 via cache bypass circuitry 60 along with the activation signal 50a. Cache 50 will thus be activated in a similar manner as during a read operation and will similarly operate to determine whether a data block corresponding to the write address Adr of the data block to be written is stored in the cache. If so, a "hit" has occurred and results in the new data block overwriting the present data in the corresponding data block stored in the cache 50. The write operation is thus completed in this expeditious manner without the delay of having to wait for the data block to actually be written on the disk drives. Such writing on the disk drives may be provided via lines 52 at a later time when the system is not busy, such as described, for example, in the above mentioned U.S. Pat. No. 4,394,733.

If, on the other hand, the data block to be written is not found in cache 50, then a "miss" has occurred and the cache 50 applies the "miss" signal 50b to the cache bypass circuitry 60. In response to this "miss" signal 50b, cache bypass circuitry 60 provides for a disk write operation in the same manner as occurs during non-caching operation. It is also within the scope of the invention to additionally provide, in response to a write "miss," for the addressed data block to be stored in cache 50, as well as being written on the disk drives, so that advantage can be taken of an algorithm such as the previously mentioned LRU algorithm. In the same manner as described for a read operation, if the cache 50 is full at that time, this new data block would replace the least recently used data block in the cache, which displaced data block could be returned to its corresponding location in disk storage if appropriate.

It is to be understood that the positioning of cache 50 at the disk drive side of the data organizer 34, as shown in FIG. 5, with an organization corresponding thereto, and an operation as described, permits caching to be provided for both reading and writing in a manner which retains the high bandpass and high fault tolerance characteristics of the multi-disk drive system of FIG. 3. In this regard, note that cache 50 is organized to provide for serial input and output of the data words making up a block (see, for example, FIG. 4).

Figure 6:
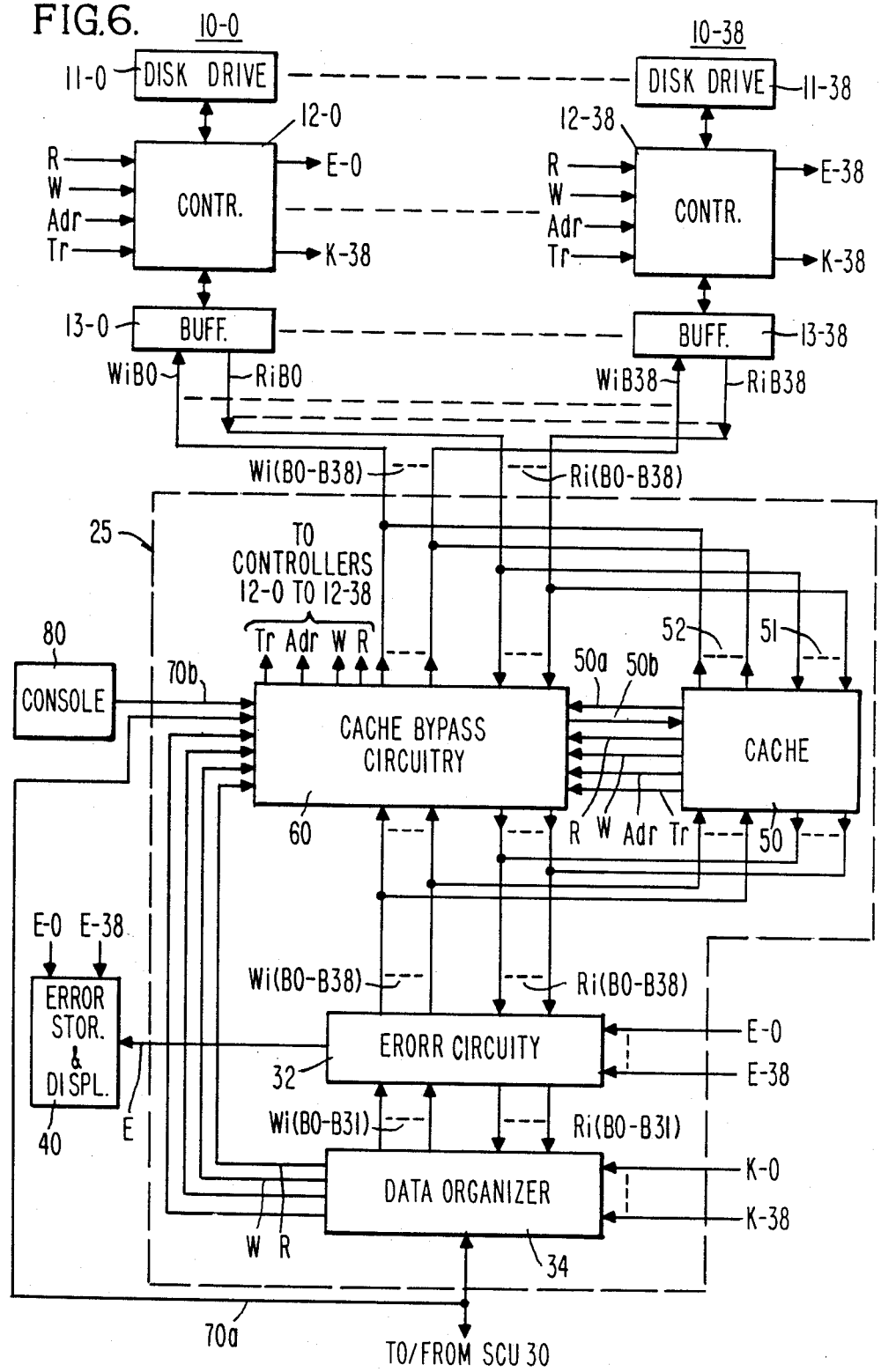

Referring next to FIG. 6, illustrated therein is another embodiment of the invention showing another way of employing caching in the multiple disk drive system of FIG. 3. In the embodiment of FIG. 6, cache 50 and cache bypass circuitry 60 are placed on the disk drive side of the error circuitry 32, instead of on the opposite side as in FIG. 5. The construction and operation of the cache 50 and cache bypass circuitry 60 in the embodiment of FIG. 6 is the same as described for FIG. 5, except that each word of a data block is now 39-bits long as a result of the error circuitry 32 having added the 7 check bits B32–B38 to the 32 data bits B0–B31. The cache 50 and cache bypass circuitry 60 thus have to provide for handling these larger size words. The embodiment of FIG. 6 makes it possible for error circuitry 32 to correct errors occurring in cache 50 as well as in the disk drives. In such a case, it will still be possible for maintenance purposes to determine whether an error is in a disk drive or occurs elsewhere by reference to the controller error signals E-0 to E-38 as described in connection with FIG. 3. If none of these error signals E-0 to E-38 indicate the presence of a disk drive error, it can be assumed that a detected error has occurred elsewhere, such as in cache 50.

Figure 7:
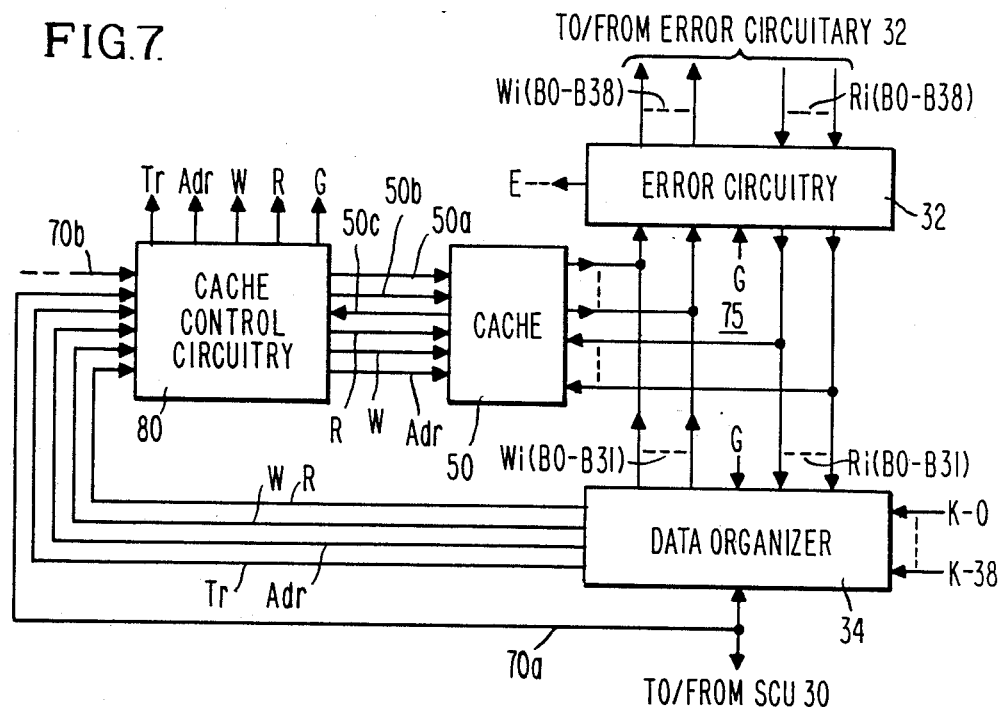

Referring next to FIG. 7, illustrated therein are pertinent portions of another embodiment of the invention which is generally similar to the previously described FIG. 5 embodiment, except that cache control circuitry 80 is substituted for cache bypass circuitry 60 in FIG. 5, and duplex bus arrangement 75 is employed between data organizer 34, error circuitry 32, and cache 50 instead of providing the paths shown in FIG. 5. Portions not shown in FIG. 7 may be the same as illustrated in FIG. 5. It will be understood with respect to FIG. 7 that cache control circuitry 80 performs the same control functions as described for cache bypass circuitry 60 in FIG. 5, and that operation of the FIG. 7 embodiment is the same as previously described for the FIG. 5 embodiment except that data words are communicated between the data organizer 34, error circuitry 32, and cache 50 using the duplex bus arrangement 75.

Figure 8:
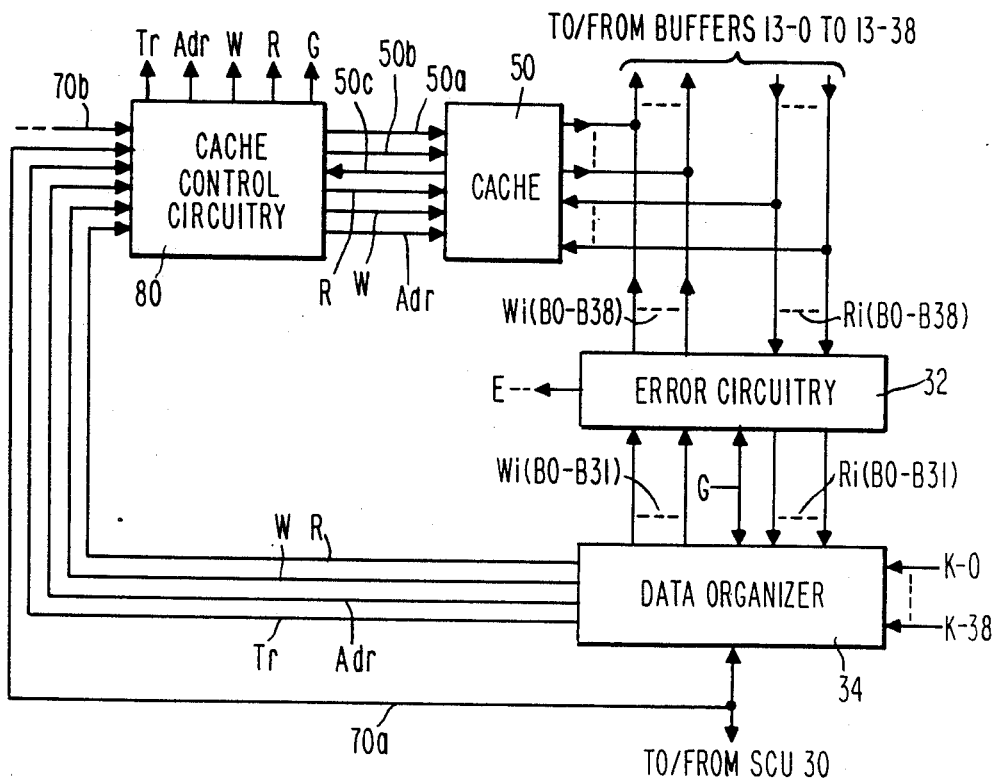

FIG. 8 illustrates pertinent portions of still another embodiment of the invention which is a duplex bus version of the previously described FIG. 6 embodiment. Similarly to the FIG. 5 and FIG. 7 embodiments, the FIG. 8 embodiment is generally similar to that of FIG. 6 except that cache control circuitry 80 is substituted for the cache bypass circuitry 60 in FIG. 6, and duplex bus arrangement 85 is employed between error correction circuitry 32, cache 50, and buffers 13-0 to 13-38 instead of providing the paths shown in FIG. 5. Also, operation of the FIG. 8 embodiment is the same as for the FIG. 6 embodiment, except that data words are communicated between error circuitry 32, cache 50, and buffers 13-0 to 13-8 using the duplex bus arrangement 85.

FIG. 7 illustrates a modified version of the embodiment of FIG. 5.

FIG. 8 illustrates a modified version of the embodiment of FIG. 6.

Although the present invention has been described in connection with particular preferred embodiments, it is to be understood that many additions, modifications and variations in construction, arrangement, method and use may be made within the scope of the invention. Accordingly, the invention is to be considered as including all possible modifications, variations and additions coming within the scope of the following claims.

What is claimed is:

1. A method for accessing a large quantity of digital data in a manner so as to achieve a high fault tolerance level as well as a high bandpass, said method comprising:

providing a set of separably operable disk drive means each including at least one rotatable disk and cooperating head means;

receiving data to be written on said disk drive means as data digits;

generating error check digits is response to said data digits; writing data on said set of separably operable disk drive means in the form of data words each comprised of data digits and at least one associated error check digit chosen so as to permit an error in a data word to be determinable, said data words being stored in said set of disk drive means such that each disk drive means stores at least one digit of each data word;

reading data from said set of disk drive means as a plurality of data words;

error detecting and correcting data words read from said set of disk drive means using the associated error check digits; and producing electrical signals corresponding to the data digits of a data word after said error correcting;

said method including providing caching of data stored on said set of disk means using a cache memory constructed and arranged to operate in a manner such that data words are stored in said cache memory and accessed therefrom in correspondence with the manner in which data words are stored on said set of disk means.

2. The invention in accordance with claim 1, wherein each digit is a bit.

3. The invention in accordance with claim 1, including the step of organizing the received data digits and error check digits into a format corresponding to the manner in which said data words are recorded on the disks of said disk drive means.

4. The invention in accordance with claim 3, including the step following said producing of reorganizing the data words into a channel format, and applying the channel-formatted electrical signals to a channel.

5. The invention in accordance with claim 1 wherein the step of reading is performed in parallel for all of said disk means.

6. The invention in accordance with claim 1 wherein the steps of reading and writing are performed in parallel for all of said disk means.

7. The invention in accordance with claim 7, wherein said disk drive means are unsynchronized, and including the step of providing sufficient time for the steps of reading and writing to accommodate worst case positioning of the disk head means relative to the addressed location on their respective disks.

8. The invention in accordance with claim 1, wherein the steps of reading and writing are performed in parallel for all of said disk means in response to a commonly applied address.

9. The invention in accordance with claim 1, wherein each disk drive means provides an error indication indicative of whether an error may have occurred during a read or write operation performed thereby, and wherein the step of error detecting and correcting employs these error indications for correcting errors in data words read from said set of disk drive means.

10. A high capacity disk storage system comprising:
a multiplicity of independently operable disk drive subsystems, each disk subsystem including a disk containing stored data, wherein data is stored on each disk in the form of data words, each data word comprising a plurality of data digits along with at least one associated error check digit chosen so as to permit detection of an error in the data word, each disk storing at least one digit from each data word;
means coupled to said disk subsystem for reading a data word from the disks thereof and for producing data word electrical signals corresponding thereto;
means including a cache memory for providing caching with respect to said disk drive subsystems, wherein said cache memory is organized to store and output data words in a manner corresponding to the storage of said data words on said disks;
error circuit means to which said data word electrical signals are applied, said error circuit means being operable to produce electrical signals corresponding to the data digits of a data word read from said disk means, said error means operating in a manner such that an error in a data digit will be detected and corrected by said error circuit means using the associated error check digits of the data word.

11. The invention in accordance with claim 10, wherein said system includes coupling means for applying to said error circuit means electrical signals corresponding to data digits of a data word to be written on said disk means, wherein said error means is operable in response to these applied electrical signals corresponding to the data digits of a data word to be written to produce electrical signals corresponding to a data word comprised of these data digits and associated error check digits derived therefrom, and wherein said system includes means coupled to said disk drive subsystems for writing a data word corresponding to these data word electrical signals produced by said error circuit means on said disk means in a manner such that each disk means stores at least one digit of a written data word.

12. The invention in accordance with claim 11, wherein each digit comprises a binary bit.

13. The invention in accordance with claim 12, wherein said coupling means is also operative to receive electrical signals produced by said error circuit means corresponding to data digits of a data word read from said disk means and to transmit electrical signals corresponding thereto to said storage control means.

14. The invention in accordance with claim 11, including storage control means, and wherein said coupling means is operative to receive data from said storage control means which is to be written on said disk means for organizing this received data into electrical signals corresponding to data digits of a data word for application to said error circuit means.

15. The invention in accordance with claim 14, wherein said caching means are located between said coupling means for and said error circuit means.

16. The invention in accordance with claim 14, wherein said caching means are located between said error circuit means and said disk drive subsystems.

17. The invention in accordance with claim 10, wherein the digits of a data word are read from said disk means in parallel.

18. The invention in accordance with claim 17, wherein the digits of a data word are written in parallel on said disk means.

19. The invention in accordance with claim 18, wherein the parallel reading and writing of a data word is provided at a common location for all of said disk means.

20. A high capacity disk storage system comprising:
a relatively large plurality of separately operable disk drive means for storing data, each disk drive means providing an error indication in the event of a possible error;
means for receiving data to be stored on said disk storage system as data digits,
error circuit means for generating check digits in response to said data digits;
writing means for writing data on said disk drive means in the form of data words, each data word being comprised of a plurality of data digits and at least one associated error check digit chosen so as to permit an error in at least one digit of a data word to be detected, each disk means storing at least one digit of each data word;
reading means for reading data words from said disk means which are applied to said error circuit means
said error circuit means being responsive to said error check digits and said error indications for producing output electrical signals corresponding to the data digits of each applied data word such that a data word error is corrected; and means including a cache memory for providing caching with respect to said disk drive means, wherein said cache memory is organized to store and output data words in a manner corresponding to the storage of said data words on said disks.

21. The invention in accordance with claim 20, wherein said memory means and said writing means operate in parallel with respect to said disk means.

22. The invention in accordance with claim 21, including means for applying an address to said reading and writing means which determines the address at which reading or writing is performed on said disk drive means, said address being common to all of said disk means.

23. A high capacity disk storage system comprising:
a relatively large plurality of separably operable disk drive subsystems;
means for receiving data to be stored on said disk storage system as data digits;
error circuit means for generating check digits in response to said data digits;
each disk subsystem including disk drive means for storing data, wherein data is stored on the disk means of said subsystems in the form of data words, each data word being comprised of a plurality of data digits and at least one associated error check digit chosen so as to permit an error in a data word to be detected, each disk drive means storing a respective one of the digits of a data word;
each disk drive subsystem also including controller means for reading a selectable predetermined plurality of digits from its respective disk drive means;
each disk subsystem additionally including buffer means for storing digits read from its respective disk means by its respective controller means;
said error circuit means being operable to receive a data word from said buffer means and to provide error detection and correction therefor using the error check digits thereof such that electrical signals are outputted by said error circuit means corresponding to the data digits of an applied data word, wherein an error occurring in one of the data digits is corrected;
coupling means coupled to the controller means of said disk subsystems for transferring data digits stored in the buffer means of said subsystems to said error circuit means in the form of data words; and
caching means including a cache memory for providing caching with respect to said disk drive subsystems, said cache memory being organized to store and output data words in a manner corresponding to the manner in which data words are stored on said disk drive means.

24. A high capacity disk storage system comprising:
a relatively large plurality of separably operable disk drive subsystems;
each disk subsystem including disk drive means for storing data, controller means capable of reading data from and writing data on its respective disk means at a selectable address, and buffer means for storing data read from its respective disk means by its respective controller means and for storing data to be written on its respective disk drive means by its respective controller, each controller also being operable to provide an error indication in the event an error may have occurred during a read or write operation by its respective disk drive means;
means for receiving data to be stored on said disk storage system as data digits,
error circuit means for generating check digits in response to said data digits,
means for storing data words to be written on said disk means in the buffer means of said subsystems, each data word being comprised of data digits and at least one associated error check digit chosen so as to permit detection of an error in a data word, each data word being stored in said buffer means such that each buffer means stores a respective one of the digits thereof;
each controller means being operable in parallel with the other controller means and in response to an applied address to write digits stored in its respective buffer means on its respective disk means at a location determined by said address;
each controller means also being operable in parallel with the other controller means in response to an applied address commonly applied to all of said controller means to read digits from its respective disk means at a location determined by said address and to store the digits read in its respective buffer means;
each controller means further operable in parallel with the other controller means and in response to an initiation signal commonly applied to all of said controller means to cause a digit of a data word to be outputted from each buffer so as to thereby form a data word;
said error circuit means being responsive to a data word outputted from said buffer means and to said controller error indications and said check digits for providing electrical output signals corresponding to the data digits thereof and for providing corrected output signals if an error in a data word is detected; and
means including a cache memory for providing caching with respect to said disk drive means, wherein said cache memory is organized to store and output data words in a manner corresponding to the storage of said data words on said disks.

25. The invention in accordance with claim 24, wherein said controller means is operable in response to said initiation signal to cause said buffer means to successively output a predetermined plurality of data words to said error circuit means.

26. The invention in accordance with claim 24, wherein said initiation signal is provided at a time chosen such that all of the respective digits of each data word to be outputted will have been read into their respective buffer means by their respective controller means.

27. The invention in accordance with claim 24, wherein a common address is applied to all of said controller means for reading and writing.

28. The invention in accordance with claim 24, wherein said disk drive means are unsynchronized and each disk drive means includes at least one rotatable disk and cooperating head means; and wherein operation is chosen so that sufficient time is available for the aforesaid reading and writing provided by said controller means to accommodate worst case positioning of the head means relative to the addressed location of their respective disks.

* * * * *